United States Patent
Chen et al.

(10) Patent No.: US 10,824,309 B2
(45) Date of Patent: Nov. 3, 2020

(54) NAVIGATION SYSTEM WITH NOTIFICATION MECHANISM AND METHOD OF OPERATION THEREOF

(71) Applicant: Telenav, Inc., Sunnyvale, CA (US)

(72) Inventors: Yiwei Chen, Sugar Land, TX (US); Liang Ma, Sunnyvale, CA (US); Zongyoung Wang, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 682 days.

(21) Appl. No.: 13/933,226

(22) Filed: Jul. 2, 2013

(65) Prior Publication Data
US 2015/0012878 A1    Jan. 8, 2015

(51) Int. Cl.
| | |
|---|---|
| *G01C 21/26* | (2006.01) |
| *G06F 3/0484* | (2013.01) |
| *G06F 3/0486* | (2013.01) |
| *G06F 3/0488* | (2013.01) |
| *G01C 21/36* | (2006.01) |

(52) U.S. Cl.
CPC ......... *G06F 3/04842* (2013.01); *G01C 21/26* (2013.01); *G01C 21/3697* (2013.01); *G06F 3/0484* (2013.01); *G06F 3/0486* (2013.01); *G06F 3/04886* (2013.01)

(58) Field of Classification Search
CPC .. G06F 3/0481; G06F 3/04842; G06F 3/0484; G06F 3/0486; G06F 3/04886; G09G 5/14; G01C 21/26; G01C 21/3697
USPC ........................................................ 715/788
See application file for complete search history.

(56) References Cited

U.S. PATENT DOCUMENTS

| | | | |
|---|---|---|---|
| 2003/0184594 A1* | 10/2003 | Ellenby .................. | G01C 21/20 715/810 |
| 2007/0027628 A1 | 2/2007 | Geelen | |
| 2007/0208616 A1 | 9/2007 | Choi | |
| 2008/0162534 A1* | 7/2008 | Muhonen ............... | G06Q 30/02 |
| 2009/0030777 A1 | 1/2009 | Bridges et al. | |
| 2009/0149199 A1 | 6/2009 | Maghoul | |
| 2009/0198607 A1* | 8/2009 | Badger .................. | G06Q 30/02 705/37 |
| 2009/0287561 A1 | 11/2009 | Rybak et al. | |
| 2009/0313126 A1* | 12/2009 | Jain ..................... | G06Q 30/0601 705/14.71 |
| 2010/0010958 A1* | 1/2010 | Perrow et al. .................... | 707/1 |
| 2010/0223003 A1* | 9/2010 | Harada .............. | G01C 21/3682 701/533 |
| 2011/0022451 A1 | 1/2011 | Jardine et al. | |
| 2012/0096403 A1* | 4/2012 | Jung ................... | G01C 21/3617 715/817 |
| 2012/0246177 A1* | 9/2012 | Perrow .............. | G06Q 30/0261 707/750 |
| 2013/0120464 A1* | 5/2013 | Wei ..................... | G06F 3/04842 345/672 |

OTHER PUBLICATIONS

Waze, https://www.waze.com/.

* cited by examiner

*Primary Examiner* — Matthew Ell
*Assistant Examiner* — Pritisha N Parbadia
(74) *Attorney, Agent, or Firm* — Perspectives Law Group, Corp.

(57) ABSTRACT

A method of operation of a navigation system includes: providing a docking area adjacent to a map interface; determining a docking location within the docking area; and generating a docking notification with a control unit for displaying the docking notification at the docking location on a device.

20 Claims, 6 Drawing Sheets

NAVIGATION SYSTEM WITH NOTIFICATION MECHANISM AND METHOD OF OPERATION THEREOF

TECHNICAL FIELD

The present invention relates generally to a navigation system, and more particularly to a system with notification mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without notification mechanism has become a paramount concern for the consumer. The inability decreases the benefit of using the tool.

Thus, a need still remains for a navigation system with notification mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: providing a docking area adjacent to a map interface; determining a docking location within the docking area; and generating a docking notification with a control unit for displaying the docking notification at the docking location on a device.

The present invention provides a navigation system, including: an interface provider module for providing a docking area adjacent to a map interface; a docking determinator module, coupled to the interface provider module for determining a docking location within the docking area; and a notification module, coupled to the docking determinator module for generating a docking notification for displaying the docking notification at the docking location on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
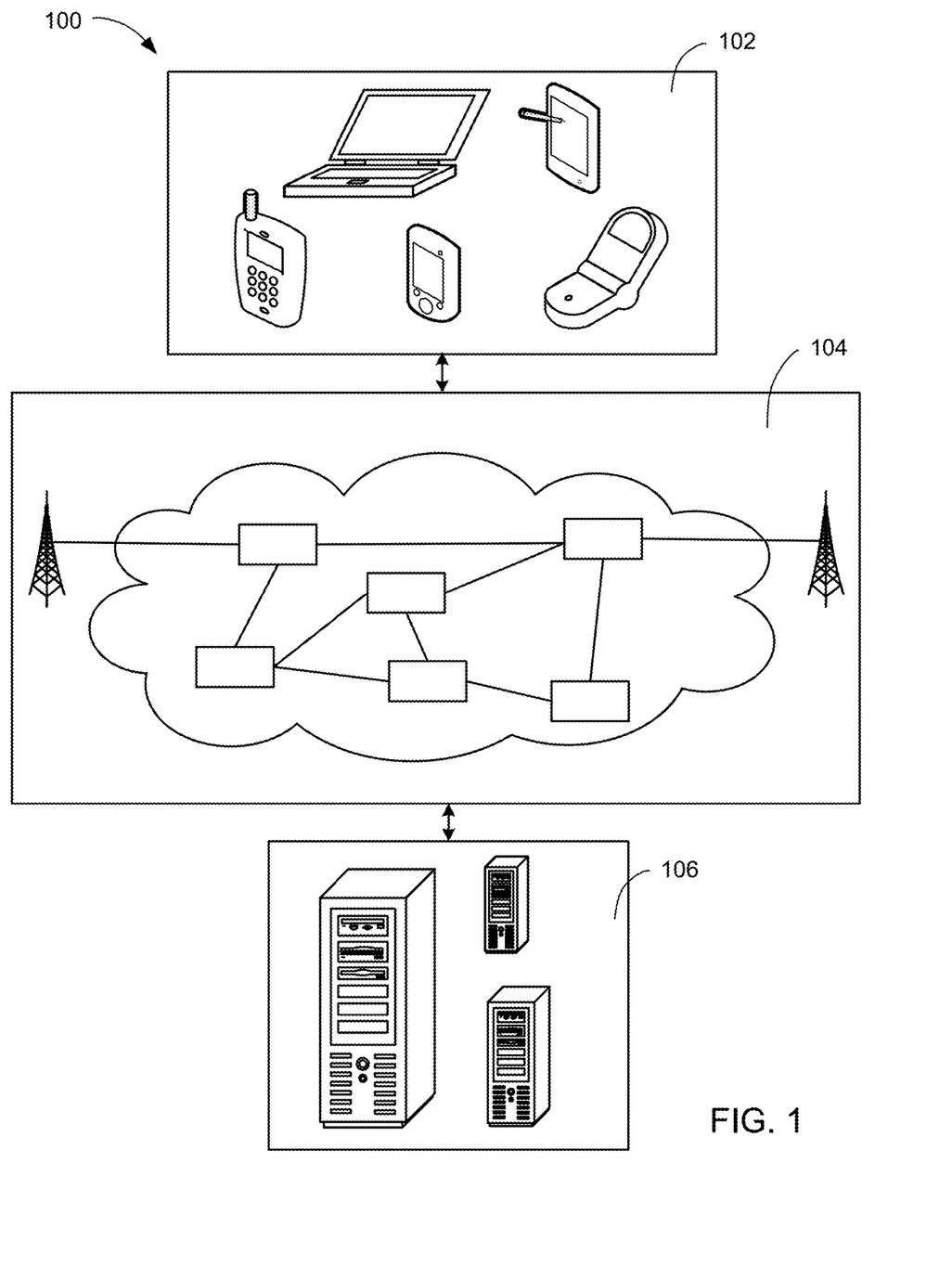
FIG. 1 is a navigation system with notification mechanism in an embodiment of the present invention.

Referring now to FIG. 1, therein is shown a navigation system 100 with notification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
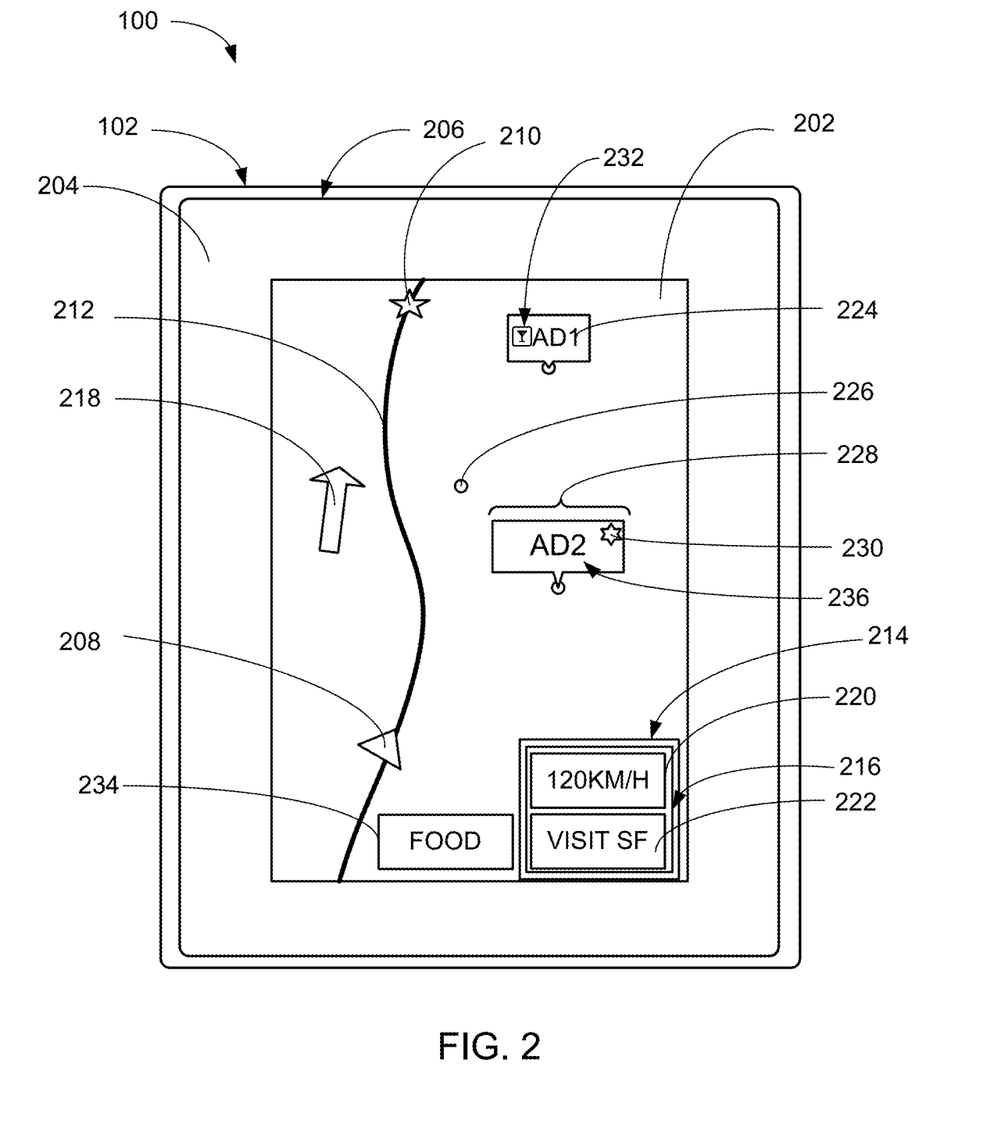
FIG. 2 is an example of a map interface, a docking area, or a combination thereof displayed on a display interface of the first device.

Referring now to FIG. 2, therein is shown an example of a map interface 202, a docking area 204, or a combination thereof displayed on a display interface 206 of the first device 102. For clarity and brevity, the discussion of the embodiment of the present invention will focus on the first device 102 delivering the result generated by the navigation system 100. However, the second device 106 of FIG. 1 and the first device 102 can be discussed interchangeably.

The map interface 202 is defined as a portion of the display interface 206 adjacent to the docking area 204 without overlapping the docking area 204. For example, the map interface 202 can display a current location 208, a destination 210, a travel route 212, or a combination thereof. The docking area 204 is defined as a portion of the display interface 206 adjacent to the map interface 202 and without overlapping the map interface 202. For example, the docking area 204 can be adjacent to the top extent, the bottom extent, the left extent, the right extent, or a combination thereof of the map interface 202.

A travel context 214 is defined as a set of facts or circumstances that surround the first device 102. For example, the travel context 214 can include an environmental condition 216. The environmental condition 216 can include the current location 208, the destination 210, the travel route 212, or a combination thereof. The current location 208 is defined as the present physical location of the first device 102. The destination 210 can represent as the endpoint of the travel route 212. The travel route 212 can represent as the path taken to reach the waypoint, the destination 210, or a combination thereof.

The travel context 214 can include a travel direction 218, a travel speed 220, a travel theme 222, or a combination thereof. The travel direction 218 is defined as cardinal points headed towards by the first device 102. For example, the cardinal points can include north, east, south, and west. For further example, the cardinal points can include intermediate directions, such as northeast, southeast, southwest, and northwest. The travel speed 220 is defined as a magnitude of velocity of the first device 102 traveling. The travel theme 222 is defined as the purpose of the travel. For example, the travel theme 222 can represent traveling to San Francisco, Calif. (CA) for dinner or traveling to Yosemite National Park for camping.

A map notification 224 is defined as information displayed on the map interface 202. For example, the map notification 224 can represent a virtual billboard that pops up along the travel route 212. For further example, the map notification 224 can represent an advertisement of an entity promoting its service, product, or a combination thereof. The entity can represent an individual, a commercial organization, or a combination thereof. A source location 226 is defined as the geographic location of the entity providing the map notification 224. For example, the source location 226 can represent the longitudinal-latitudinal coordinate, the address, or a combination thereof of the entity.

For another example, the map notification 224 can represent navigation information. More specifically, the map notification 224 can represent navigation information to inform that there is traffic congestion, hazard, or a combination thereof along the travel route 212. For a different example, the map notification 224 can represent the location information of the user's friend traveling with the same instance of the travel theme 222.

The map notification 224 can have a notification size 228, which is defined as the spatial dimension of the map notification 224. For example, the notification size 228 can represent a two-dimensional or three-dimensional spatial dimension. The map notification 224 can have a notification priority 230, which is defined as a level of importance placed on the map notification 224, a notification type 232, or a combination thereof.

The notification type 232 is defined as a categorization of the map notification 224. For example, the notification type 232 can represent restaurant, auto services, arts and entertainment, or a combination thereof. A user preference 234 can define that the notification type 232 for the restaurant can have a higher instance of the notification priority 230 over the notification type 232 of arts and entertainment. The user preference 234 is defined as a predisposition in favor disclosed by the user of the navigation system 100.

A notification quantity 236 is defined as a number of the map notification 224. For example, the notification quantity 236 can represent the number of the map notification 224 selected by the user of the navigation system 100.

Figure 3:
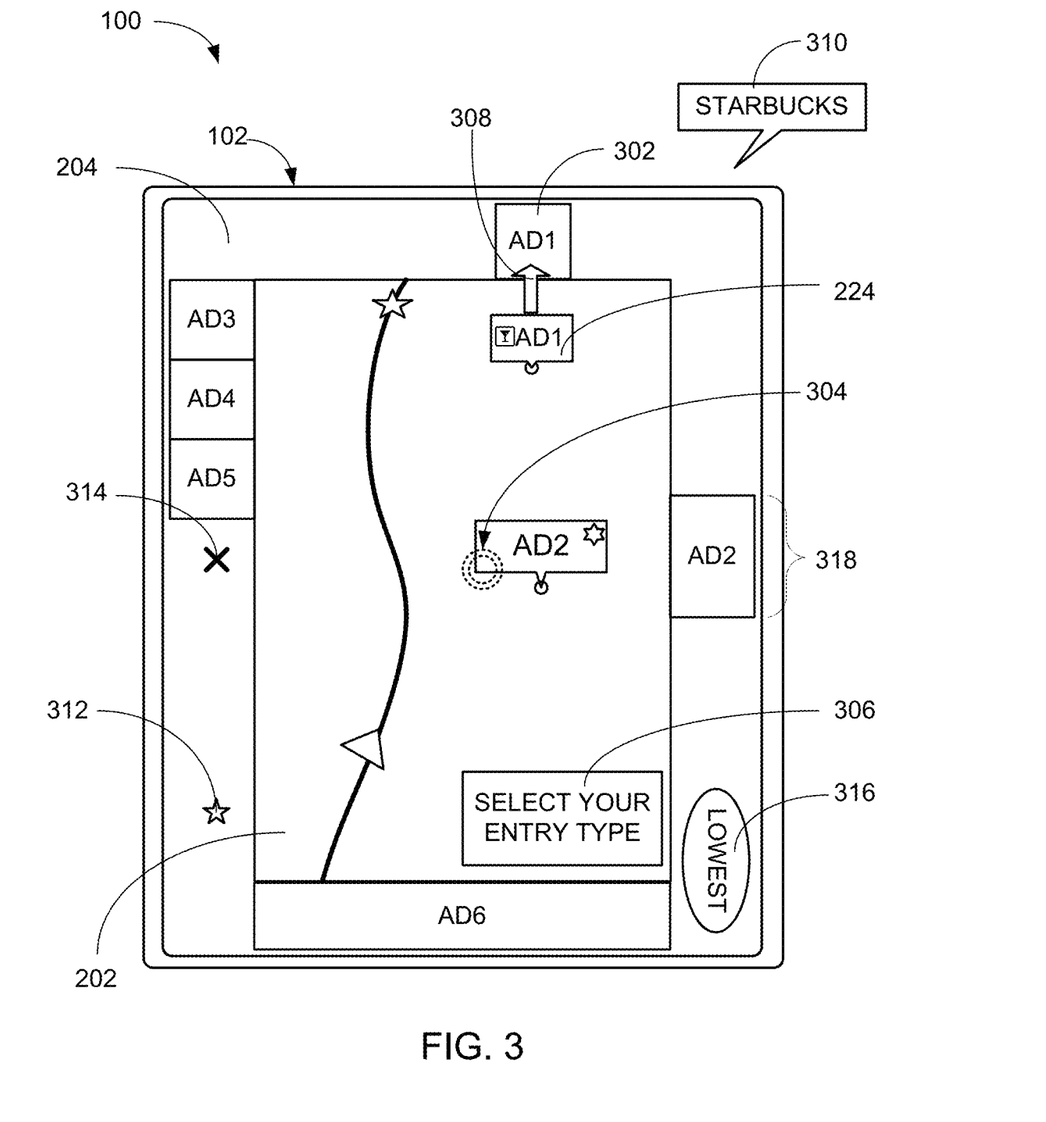
FIG. 3 is an example of a docking notification docked within the docking area.

Referring now to FIG. 3, therein is shown an example of a docking notification 302 docked within the docking area 204. The docking notification 302 is defined as the map notification 224 docked within the docking area 204 after selection. For example, the map notification 224 can represent an advertisement for Starbucks Coffee™. The user entry 304 can select the map notification 224 to dock the advertisement in the docking area 204 as the docking notification 302. The docking notification 302 can be displayed with the corresponding instance of the map notification 224. In contrast, the docking notification 302 can be displayed without the map notification displayed on the map interface 202.

An entry type 306 is defined as a categorization of the user entry 304. The entry type 306 of the user entry 304 can include a gesture type 308, a voice entry 310, or a combination thereof. The gesture type 308 is defined as a physical movement made to perform the user entry 304. For example, the gesture type 308 can include a tap gesture, a drag gesture, a shake gesture, or a combination thereof. For another example, the voice entry 310 is defined as an oral command.

The tap gesture can represent a motion where the user of the navigation system 100 makes the user entry 304 by tapping the map notification 224 displayed on the map interface 202. The drag gesture can represent a motion where the user makes the user entry 304 by dragging the map notification 224 to the docking area 204. The shake gesture can represent a motion where the user makes the user entry 304 by shaking the first device 102 up and down, side to side, or a combination thereof.

A docking location 312 is defined as a portion of the docking area 204 where the docking notification 302 will be docked or is displayed. A docking availability 314 is a portion of the docking area 204 where the docking notification 302 can be docked or displayed. If the docking area 204 does not have the docking availability 314, the docking location 312 is unavailable to display the docking notification 302. In contrast, if the docking area 204 does have the docking availability 314, the docking location 312 is available to display the docking notification 302.

An area priority 316 is defined as a level of importance placed on the docking area 204, a portion of the docking area 204, or a combination thereof. For example, a top left corner of the docking area 204 can represent the highest priority of the area priority 316 while the bottom right corner of the docking area 204 can represent the lowest priority of the area priority 316.

The docking notification 302 can have a docking size 318, which is defined as the spatial dimension of the docking notification 302. For example, the docking size 318 can represent a two-dimensional or three-dimensional spatial dimension.

Figure 4:
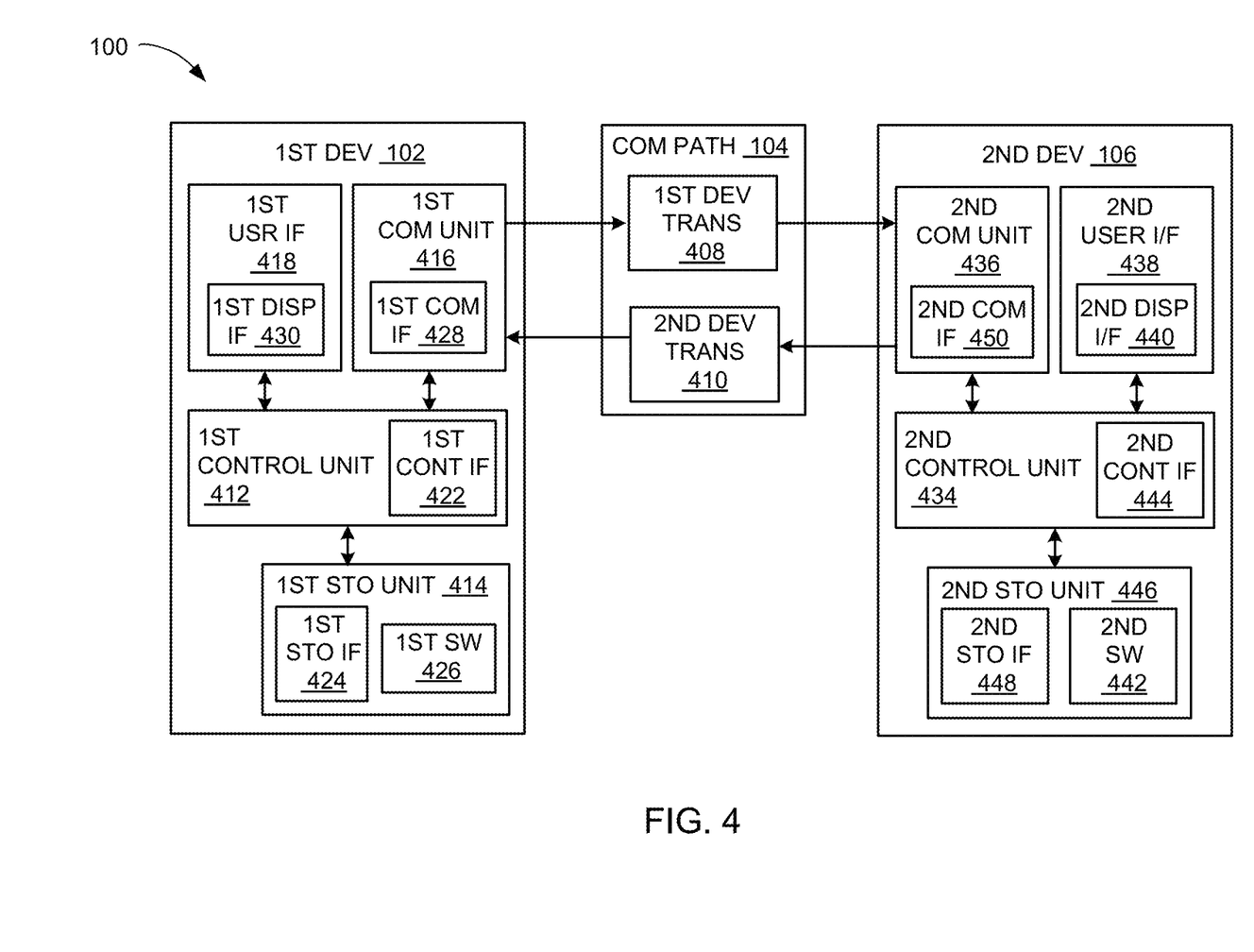
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
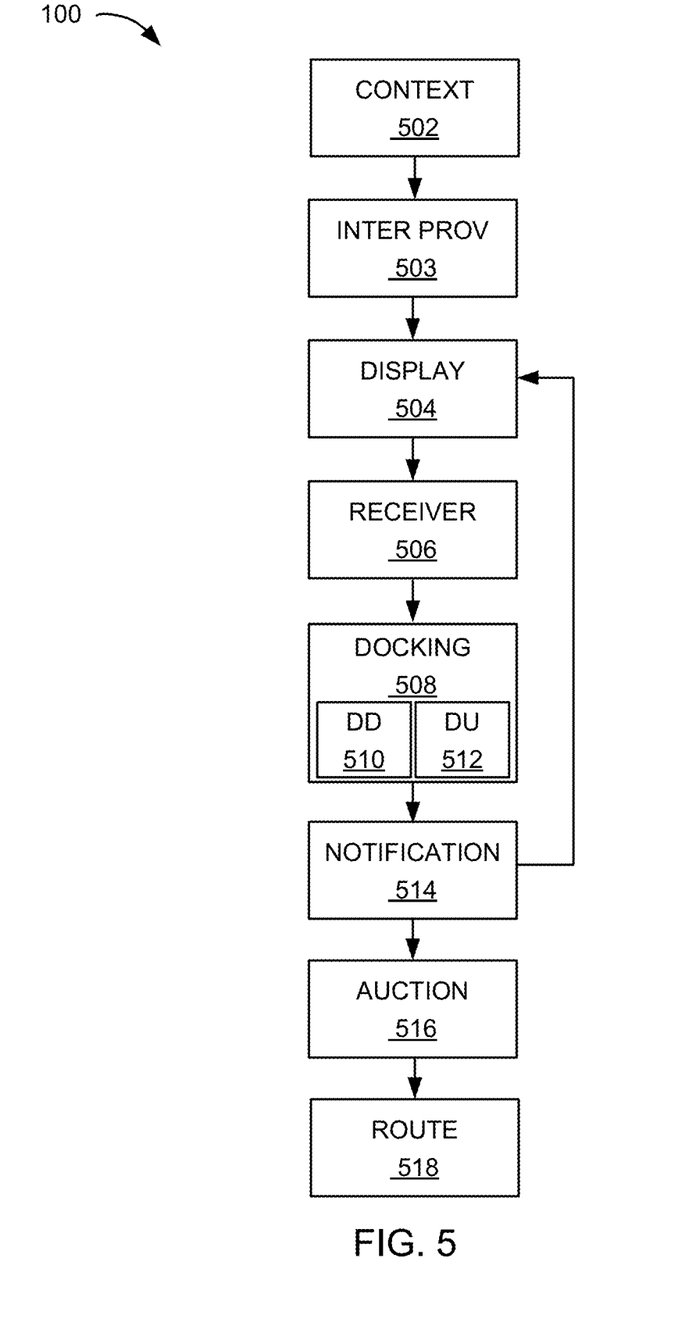
FIG. 5 is a control flow of the navigation system.

Referring now to FIG. 5, therein is shown a control flow of the navigation system 100. The navigation system 100 can include a context module 502. The context module 502 determines the travel context 214 of FIG. 2. For example, the context module 502 can determine the travel context 214 based on the environmental condition 216 of FIG. 2.

The context module 502 can determine the travel context 214 in a number of ways. For example, the environmental condition 216 can include the current location 208 of FIG. 2, the destination 210 of FIG. 2, the travel direction 218 of FIG. 2, the travel speed 220 of FIG. 2, the travel theme 222 of FIG. 2, or a combination thereof. For a specific example, the context module 502 can determine the travel context 214 based on the current location 208, the destination 210, the travel direction 218, or a combination thereof. The current location 208 can represent that the user of the navigation system 100 can be in Sunnyvale, Calif. on United States (US) Highway 101. The destination 210 at the end of the travel route 212 of FIG. 2 can represent San Francisco, Calif. The travel direction 218 can represent heading north on US Highway 101. The context module 502 can determine the travel context 214 to be traveling from Sunnyvale to San Francisco.

For further example, the context module 502 can determine the travel context 214 based on the travel speed 220. For example, the travel speed 220 can represent 120 kilometers per hour. Factoring the current location 208, the context module 502 can determine the travel context 214 to be that the user traveling on the highway.

For another example, the context module 502 can determine the travel context 214 based on the travel theme 222. The user can enter the travel theme 222 to the navigation system 100 as hiking at a national park. Factoring the destination 210, the context module 502 can determine the travel context 214 to be traveling to Yosemite for a hiking trip. The context module 502 can send the travel context 214 to an interface provider module 503.

The navigation system 100 can include the interface provider module 503, which can couple to the context module 502. The interface provider module 503 provides the map interface 202 of FIG. 2, the docking area 204 of FIG. 2, or a combination thereof for displaying on the display interface 206 of FIG. 2. For example, the interface provider module 503 can provide the docking area 204 surrounding the map interface 202 without overlapping the map interface 202.

The interface provider module 503 can provide the map interface 202, the docking area 204, or a combination thereof in a number of ways. For example, the interface provider module 503 can provide the docking area 204 adjacent to the extent of the map interface 202. More specifically, The interface provider module 503 can provide the docking area 204 adjacent to the top extent, the bottom extent, the left extent, the right extent, or a combination thereof of the map interface 202 without overlapping the map interface 202.

For a different example, the interface provider module 503 can provide the docking area 204 at one extent of the map interface 202. More specifically, the interface provider module 503 can provide the docking area 204 at the right extent of the map interface 202 but not at the top extent, the bottom extent, the left extent, or a combination thereof of the map interface 202. The interface provider module 503 can send the map interface 202, the docking area 204, or a combination thereof to a display module 504.

It has been discovered that the navigation system 100 providing the docking area 204 without overlapping the map interface 202 can improve the safety of operating the navigation system 100, the vehicle, or a combination thereof. By designating a location on the display interface 206 to save the map notification 224 of FIG. 2 interested by the user of the navigation system 100, the user can be alleviated from the burden of remembering the map notification 224 while operating the navigation system 100, the vehicle, or a combination thereof. As a result, the user can focus on operating the vehicle for improving the safety of the user.

The navigation system 100 can include the display module 504, which can couple to the context module 502. The display module 504 displays the map notification 224. For example, the display module 504 can display the map notification 224 based on the travel context 214.

The display module 504 can display the map notification 224 in a number of ways. For example, the display module 504 can display the map notification 224 on the map interface 202 of the display interface 206. More specifically, the display module 504 can display the map notification 224 based on the travel context 214, the source location 226 of FIG. 2, or a combination thereof. For example, the travel context 214 can representing traveling north on US Highway 101. The source location 226 can represent northwest from the current location 208. The display module 504 can display the map notification 224 at northwest relative to the current location 208.

For a different example, the display module 504 can display the docking area 204 at the top extent, the bottom extent, the left extent, the right extent, or a combination thereof of the map interface 202. More specifically, the display module 504 can display the docking area 204 with the docking availability 314 of FIG. 3. The display module 504 can display the map notification 224 on the map interface 202 with the docking area 204.

The navigation system 100 can include a receiver module 506, which can couple to the display module 504. The receiver module 506 receives the user entry 304 of FIG. 3.

For example, the receiver module 506 can receive the user entry 304 with a variety of the entry type 306 of FIG. 3 for selecting the map notification 224 displayed on the map interface 202.

The receiver module 506 can receive the user entry 304 in a number of ways. For example, the receiver module 506 can receive the user entry 304 representing the gesture type 308 of FIG. 3. More specifically, the gesture type 308 can represent a tap on the map notification 224. For another example, the gesture type 308 can represent a dragging of the map notification 224 to the docking area 204.

For a different example, the receiver module 506 can receive the user entry 304 representing the voice entry 310 of FIG. 3. More specifically, the voice entry 310 can specify the map notification 224 and the docking location 312 of FIG. 3 for the map notification to be docked on the docking area 204. The receiver module 506 can send the user entry 304 to a docking module 508.

The navigation system 100 can include a docking module 508, which can couple to the receiver module 506. The docking module 508 determines, updates, or a combination thereof the docking location 312. For example, the docking module 508 can determine the docking location 312 based on the source location 226.

The docking module 508 can include a docking determinator module 510. The docking determinator module 510 determines the docking location 312. For example, the docking determinator module 510 can determine the docking location 312 based on the docking availability 314 of the docking area 204.

The docking determinator module 510 can determine the docking location 312 in a number of ways. For example, the docking determinator module 510 can determine the docking location 312 based on the travel context 214, the source location 226, or a combination thereof. More specifically, the docking determinator module 510 can determine the docking location 312 based on the source location 226 relative to the current location 208, the travel direction 218, or a combination thereof.

For a specific example, the source location 226 can represent the northwest of the current location 208. The travel direction 218 can represent heading north. The docking determinator module 510 can determine the docking location 312 to be within the docking area 204 that is top left extent to the map interface 202. More specifically, the docking determinator module 510 can determine the docking location 312 to be at the docking area 204 that is latitudinally, longitudinally, or a combination thereof aligned to the source location 226. As discussed, the source location 226 can represent northwest of the current location 208. If the travel direction 218 is heading north, the docking determinator module 510 can determine the docking location 312 to be within the docking area 204 that aligns with the longitudinal coordinate of the source location 226. In contrast, if the travel direction 218 is heading west, the docking determinator module 510 can determine the docking location 312 to be within the docking area 204 that aligns with the latitudinal coordinate of the source location 226.

It has been discovered that the navigation system 100 can determine the docking location 312 based on the travel context 214, the source location 226, or a combination thereof to improve the safe operation of the vehicle, the navigation system 100, or a combination thereof. By determining the docking location 312 relative to the current location 208, the travel direction 218, the source location 226, or a combination thereof, the navigation system 100 can display the docking notification 302 of FIG. 3 relative to the current location 208, the travel direction 218, the source location 226, or a combination thereof. As a result, the safety of the user operating the vehicle, the navigation system 100 improves by improving the visibility of the docking notification 302.

For a different example, the docking determinator module 510 can determine the docking location 312 based on the docking availability 314 of the docking area 204. For example, the some portion of docking area 204 can be filled with other instances of the docking notification 302. For a specific example, the docking area 204 relative to the left extent of the map interface 202 can be completely occupied. The docking determinator module 510 can determine the docking location 312 to be at the docking area 204 relative to the top extent or the bottom extent of the map interface 202 where the docking availability 314 allows the docking notification 302 to be displayed.

For a different example, the docking determinator module 510 can determine the docking location 312 based on the notification type 232 of FIG. 2 of the map notification 224. More specifically, the user of the navigation system 100 can set the user preference 234 of FIG. 2 to define that certain instance of the notification type 232 to be displayed in a specific area of the docking area 204. For example, the user preference 234 can set the notification type 232 for the map notification 224 related to restaurant to be docked at the docking area 204 that is at the top extent of the map interface 202. The docking determinator module 510 can determine the docking location 312 for the notification type 232 of restaurant advertisement at the docking area 204 that is at the top extent of the map interface 202.

It has been discovered that the navigation system 100 determining the docking location 312 based on the notification type 232 can improve the safety of operating the navigation system 100, the vehicle, or a combination thereof. By organizing the docking location 312 specific to the notification type 232, the navigation system 100 can alleviate the burden by the user to locate the docking notification 302 interested by the user. As a result, the user can focus on operating the vehicle to improve the safety of the user.

For a different example, the docking determinator module 510 can determine the docking location 312 based on the notification size 228 of FIG. 2 of the map notification 224. Some instance of the map notification 224 can have the notification size 228 bigger than notification size 228 of another instance of the map notification 224 based on the monetary fee paid to advertise. The docking determinator module 510 can determine the docking location 312 within the docking area 204 having the docking availability 314 to display the docking notification 302 representing the map notification 224. For example, based on the notification size 228 and the docking availability 314, the docking determinator module 510 can determine the docking location 312 to be the docking area 204 that is relative to the entire bottom extent of the map interface 202.

For a different example, the docking determinator module 510 can determine the docking location 312 based on the notification priority 230 of FIG. 2, the area priority 316 of FIG. 3, or a combination thereof. More specifically, the docking area 204 can be segmented based on the area priority 316. For example, the top left corner of the docking area 204 can represent the area priority 316 with the highest priority. In contrast, the bottom right corner of the docking area 204 can represent the area priority 316 with the lowest priority. The docking determinator module 510 can determine the docking location 312 for the map notification 224 based on the notification priority 230. More specifically, amongst two instances of the map notification 224 with one instance having the notification priority 230 higher than another, the docking determinator module 510 can determine the docking location 312 of the map notification 224 with the higher instance of the notification priority 230 to be within the docking area 204 with the higher instance of the area priority 316. The docking determinator module 510 can determine the docking location 312 for the map notification 224 wither the lower instance of the notification priority 230 to be within the docking area 204 with the lower instance of the area priority 316.

It has been discovered that the navigation system 100 determining the docking location 312 based on the notification priority 230 improves the safety of operating the navigation system 100, the vehicle, or a combination thereof. By organizing the docking location 312 specific to the notification priority 230, the navigation system 100 can alleviate the burden by the user to locate the docking notification 302 interested by the user. As a result, the user can focus on operating the vehicle to improve the safety of the user.

For a different example, the docking determinator module 510 can determine the docking location 312 based on the entry type 306. More specifically, the docking determinator module 510 can determine the docking location 312 of the map notification 224 selected by the voice entry 310 to be within the docking area 204 relative to the top extent of the map interface 202. For another example, the docking determinator module 510 can determine the docking location 312 of the map notification 224 selected by the user entry 304 representing the gesture type 308 to be within the docking area 204 relative to the side extent of the map interface 202.

It has been discovered that the navigation system 100 determining the docking location 312 based on the entry type 306 improves the safety of operating the navigation system 100, the vehicle, or a combination thereof. By organizing the docking location 312 specific to the entry type 306, the navigation system 100 can alleviate the burden by the user to locate the docking notification 302 interested by the user. As a result, the user can focus on operating the vehicle to improve the safety of the user.

The docking module 508 can include a docking updater module 512. The docking updater module 512 updates the docking location 312. For example the docking updater module 512 can update the docking location 312 based on the travel context 214, the source location 226, or a combination thereof.

For a specific example, the current location 208 can initially be southwest of the source location 226. As the user of the navigation system 100 continues to travel with the travel direction 218 of north, the source location 226 can be east relative to the current location 208. The docking updater module 512 can update the docking location 312 to align with the updated relative location of the current location 208 to the source location 226. The docking module 508 can send the docking location 312 to a notification module 514.

It has been discovered that the navigation system 100 updating the docking location 312 based on the travel context 214, the source location 226, or a combination thereof improves the safety of operating the navigation system 100, the vehicle, or a combination thereof. By updating the docking location 312 specific to the travel context 214, the source location 226, or a combination thereof, the navigation system 100 can alleviate the burden by the user to locate the docking notification 302 interested by the user. As a result, the user can focus on operating the vehicle to improve the safety of the user.

The navigation system 100 can include the notification module 514, which can couple to the docking module 508. The notification module 514 generates the docking notification 302. For example, the notification module 514 can generate the docking notification 302 based on the docking location 312.

The notification module 514 can generate the docking notification 302 in a number of ways. For example, the notification module 514 can generate the docking notification 302 based on the map notification 224 selected for the docking location 312. For another example, the notification module 514 can generate the docking notification 302 with the docking size 318 of FIG. 3. More specifically, the notification module 514 can generate the docking notification 302 having the docking size 318 that corresponds with the notification size 228 of the map notification 224. For a specific example, the notification size 228 of the map notification 224 can fill the docking area 204 that is adjacent to the entire side extent of the map interface 202. The notification module 514 can generate the docking notification 302 having the docking size 318 that fills the docking area 204 and is adjacent to the entire side extent of the map interface 202.

For another example, the notification module 514 can generate the docking notification 302 with the docking size 318 based on the notification priority 230. More specifically, the notification priority 230 can indicate that the map notification 224 with higher priority than another instance of the map notification 224 can have the notification size 228 twice the size. The notification module 514 can generate the docking notification 302 with the docking size 318 having twice the size in comparison to the docking notification 302 with the lower instance of the notification priority 230.

For another example, the notification module 514 can generate the docking notification 302 based on the notification quantity 236 of FIG. 2. More specifically, the notification module 514 can generate the docking notification 302 based on the number of the notification quantity 236 of the map notification 224 selected. For a specific example, the user of the navigation system 100 can select two instances of the map notification 224 from the map interface 202. The notification module 514 can generate two instances of the docking notification 302.

For further example, the notification module 514 can generate the docking notification 302 with the docking size 318 adjusted based on the notification quantity 236. The user of the navigation system 100 can select numerous instances of the map notification 224. As the map notification 224 is selected and docked at the docking location 312 within the docking area 204, the docking area 204 can be populated with corresponding numerous instances of the docking notification 302. The notification module 514 can generate the docking notification 302 with the reduced size of the docking size 318 to able to fill all instances of the docking notification 302 within the docking area 204 to display all instances of the docking notification 302 on the display interface 206. The notification module 514 can send the docking notification 302 to the display module 504.

For illustrative purposes, the navigation system 100 is described with the display module 504 displaying the map notification 224, although the display module 504 can be operated differently. For example, the display module 504 can display the docking notification 302 around a peripheral extent of the map interface 202 without overlapping the map interface 202.

The display module 504 can display the docking notification 302 in a number of ways. For example, the display module 504 can display the docking notification 302 at the docking location 312 within the docking area 204. More specifically, the display module 504 can display the docking notification 302 aligned with the longitudinal, latitudinal, or a combination thereof geographic coordinate of the source location 226. For further example, the display module 504 can update the display of the docking notification 302 based on the travel context 214. As the user of the navigation system 100 continues with the travel, the current location 208 can be updated. The source location 226 relative to the current location 208 can also be updated. The display module 504 can update the display of the docking notification 302 that corresponds with the change of the source location 226 relative to the current location 208.

For another example, the display module 504 can display the docking notification 302 based on the notification quantity 236. As discussed above, numerous instances of the map notification 224 can be selected for docking. The display module 504 can display the number of instances of the docking notification 302 that is proportional to the notification quantity 236. For further example, the display module 504 can display the docking notification 302 by updating the docking size 318 based on the notification quantity 236. If only one instance of the map notification 224 is selected, the display module 504 can display the docking notification 302 having the docking size 318 that fills the entirety of the docking area 204. In contrast, as the notification quantity 236 increases, the display module 504 can update the docking size 318 by reducing the docking size 318 to fit the docking notification 302 within the docking area 204.

For another example, the display module 504 can display the docking notification 302 according to the notification priority 230, the notification type 232, or a combination thereof. As discussed above, the map notification 224 with the notification type 232 related to restaurant can be set with the highest instance of the notification priority 230. The user preference 234 can set that the docking area 204 adjacent to the top extent of the map interface 202 can be most visible for the user of the navigation system 100. The display module 504 can display the notification type 232 for the restaurant at the docking area 204 adjacent to the top extent of the map interface 202.

For another example, the display module 504 can display a plurality of the docking notification 302 within the docking area 204. More specifically, the display module 504 can display the plurality of the docking notification 302 contiguously. For example, one instance of the docking notification 302 can be docked in the docking area 204 at the bottom extent of the map interface 202. Another instance of the docking notification 302 can also be docked in the docking area 204 adjacent to the first instance of the docking notification 302 with the side extent of the first instance of the docking notification 302 connected to the side extent of the another instance of the docking notification 302.

For a different example, the display module 504 can display the plurality of the docking notification 302 with one instance of the docking notification 302 overlapping another instance of the docking notification 302 with the docking notification 302 overlapped can have a portion of the docking notification 302 not overlapped thus visible. For further example, the display module 504 can display the plurality of the docking notification 302 surrounding the entire extent of the map interface 202. The display module 504 can send the docking area 204 to an auction module 516.

The navigation system 100 can include the auction module 516, which can couple to the display module 504. The auction module 516 auctions the docking area 204. For example, the auction module 516 can auction the portion of the docking area 204 with the docking availability 314.

The auction module 516 can auction the docking area 204 in a number of ways. For example, the auction module 516 can auction the docking area 204 based on the area priority 316. As discussed above, the top left corner of the docking area 204 can represent the area priority 316 with the highest priority. In contrast, the bottom right corner of the docking area 204 can represent the area priority 316 with the lowest priority. The auction module 516 can request for a higher money value for the docking area 204 with the higher priority of the area priority 316.

The navigation system 100 can include a route module 518, which can couple to the auction module 516. The route module 518 generates the travel route 212. For example, the route module 518 can generate the travel route 212 based on selecting the docking notification 302. More specifically, the user entry 304 can select the docking notification 302 displayed on the display interface 206. Based on the user entry 304, the route module 518 can generate the travel route 212 from the current location 208 to the source location 226 as the destination 210.

The physical transformation from traveling along the travel route 212 from one instance of the travel context 214 to another instance of the travel context 214 results in the movement in the physical world, such as people using the first device 102, the vehicle, or a combination thereof, based on the operation of the navigation system 100. As the movement in the physical world occurs, the movement itself creates additional information that is converted back into the map notification 224, the docking location 312, or a combination thereof for generating the docking notification 302 for the continued operation of the navigation system 100 and to continue the movement in the physical world.

The first software 426 of FIG. 4 of the first device 102 of FIG. 4 can include the modules for the navigation system 100. For example, the first software 426 can include the context module 502, the interface provider module 503, the display module 504, the receiver module 506, the docking module 508, the notification module 514, the auction module 516, and the route module 518.

The first control unit 412 of FIG. 4 can execute the first software 426 for the context module 502 to determine the travel context 214. The first control unit 412 can execute the first software 426 for the interface provider module 503 to provide the map interface 202, the docking area 204, or a combination thereof. The first control unit 412 can execute the first software 426 for the display module 504 to display the map notification 224, the docking notification 302, or a combination thereof.

The first control unit 412 can execute the first software 426 for the docking module 508 to determine, update, or a combination thereof the docking location 312. The first control unit 412 can execute the first software 426 for the notification module 514 to generate the docking notification 302. The first control unit 412 can execute the first software 426 for the auction module 516 to auction the docking area 204. The first control unit 412 can execute the first software 426 for the route module 518 to generate the travel route 212.

The second software 442 of FIG. 4 of the first device 102 of FIG. 4 can include the modules for the navigation system 100. For example, the second software 442 can include the context module 502, the interface provider module 503, the display module 504, the receiver module 506, the docking module 508, the notification module 514, the auction module 516, and the route module 518.

The second control unit 434 of FIG. 4 can execute the second software 442 for the context module 502 to determine the travel context 214. The second control unit 434 can execute the second software 442 for the interface provider module 503 to provide the map interface 202, the docking area 204, or a combination thereof. The second control unit 434 can execute the second software 442 for the display module 504 to display the map notification 224, the docking notification 302, or a combination thereof.

The second control unit 434 can execute the second software 442 for the docking module 508 to determine, update, or a combination thereof the docking location 312. The second control unit 434 can execute the second software 442 for the notification module 514 to generate the docking notification 302. The second control unit 434 can execute the second software 442 for the auction module 516 to auction the docking area 204. The second control unit 434 can execute the second software 442 for the route module 518 to generate the travel route 212.

The modules of the navigation system 100 can be partitioned between the first software 426 and the second software 442. The second software 442 can include the context module 502, the docking module 508, the notification module 514, and the auction module 516. The second control unit 434 can execute modules partitioned on the second software 442 as previously described.

The first software 426 can include the display module 504 and the receiver module. Based on the size of the first storage unit 414 of FIG. 4, the first software 426 can include additional modules of the navigation system 100. The first control unit 412 can execute the modules partitioned on the first software 426 as previously described.

The first control unit 412 can operate the first communication unit 416 of FIG. 4 to send the user entry 304 to the second device 106. The first control unit 412 can operate the first software 426 to operate the location unit 420 of FIG. 4. The second communication unit 436 of FIG. 4 can send the docking notification 302 to the first device 102 through the communication path 104 of FIG. 4.

The navigation system 100 describes the module functions or order as an example. The modules can be partitioned differently. For example, the display module 504 and the receiver module 506 can be combined. Each of the modules can operate individually and independently of the other modules.

Furthermore, data generated in one module can be used by another module without being directly coupled to each other. For example, the docking module 508 can receive the map notification 224 from the display module 504.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively.

It has been discovered that the navigation system 100 generates the docking notification 302 for displaying the docking notification 302 at the docking location 312 to improve the safety and efficiency for operating the vehicle, the navigation system 100, or a combination thereof. By providing the docking area 204 adjacent to the map interface 202, the user can efficiently record the map notification 224 desired with minimal distraction. Additionally, by determining the docking location 312, the user can efficiently determine the source location 226 relative to the current location 208. As a result, the user of the navigation system 100 can focus on operating the vehicle to improve the safety of the user.

Figure 6:
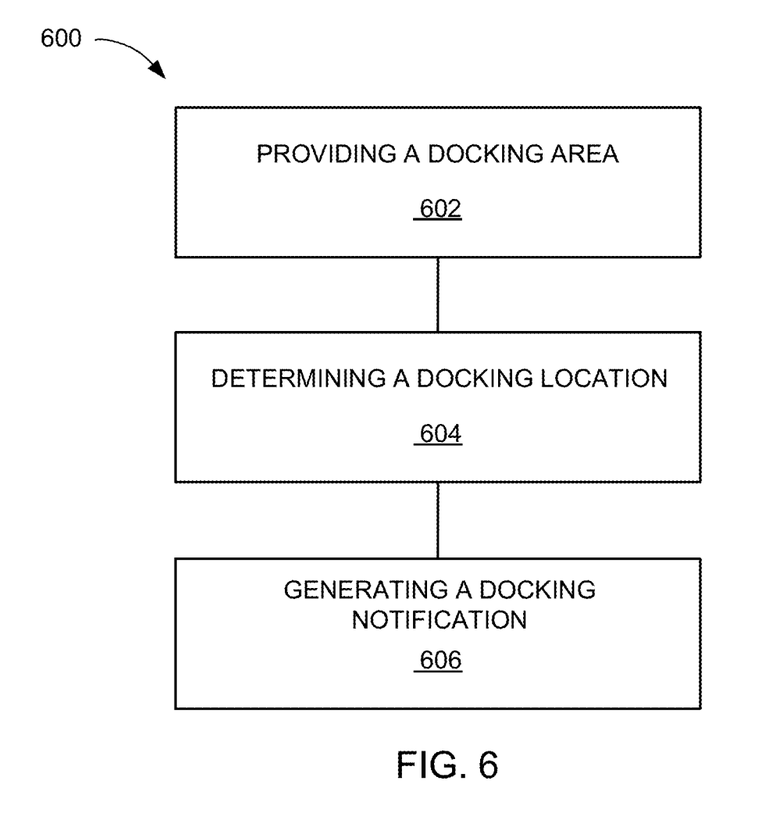
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: providing a docking area adjacent to a map interface in a block 602; determining a docking location within the docking area in a block 604; and generating a docking notification with a control unit for displaying the docking notification at the docking location on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   providing a docking area adjacent to and surrounding an entire extent of a map interface;
   determining an auction value of the docking area based on an area priority of the docking area;
   selecting a docking location, of a map notification, based on receiving a physical gesture including a shake gesture, a tap gesture, a drag gesture, or a combination thereof, representing motion of a device, to move the map notification, from a source location, on the map interface to a location in the docking area specified by a directional motion of the physical gesture and the auction value; and
   generating a docking notification based on selecting the map notification with a control unit, wherein the docking location for the docking notification is modified based on a travel context, including a travel theme, for aligning the docking notification with the source location; and
   displaying the docking notification at the docking location on a display interface of the device.

2. The method as claimed in claim 1 wherein determining the docking location includes determining the docking location based on the travel context, a source location, or a combination thereof for aligning the docking notification with the source location.

3. The method as claimed in claim 1 further comprising displaying the docking notification without overlapping the map interface.

4. The method as claimed in claim 1 further comprising auctioning the docking area based on a docking availability for displaying the docking notification.

5. The method as claimed in claim 1 wherein determining the docking location includes determining the docking location of a map notification selected based on an entry type of a user entry.

6. A method of operation of a navigation system comprising:
providing a docking area adjacent to and surrounding an entire extent of a map interface;
determining an auction value of the docking area based on an area priority of the docking area, the auction value for auctioning the docking area;
selecting a docking location, of a map notification, based on receiving a physical gesture including a shake gesture, a tap gesture, a drag gesture, or a combination thereof, representing motion of a device, to move the map notification, from a source location, on the map interface to a location in the docking area specified by a directional motion of the physical gesture and the auction value for the map notification displayed on the map interface; and
generating a docking notification based on selecting the map notification with a control unit, wherein the docking location for the docking notification is modified based on a travel context, including a travel theme, for aligning the docking notification with the source location; and
displaying the docking notification at the docking location on a display interface of the device.

7. The method as claimed in claim 6 wherein determining the docking location includes determining the docking location based on a docking availability of the docking area.

8. The method as claimed in claim 6 further comprising displaying the docking notification around a peripheral extent of the map interface without overlapping the map interface.

9. The method as claimed in claim 6 further comprising displaying a plurality of the docking notification proportional to a notification quantity of the map notification selected.

10. The method as claimed in claim 6 further comprising updating the docking location based on the travel context, a source location, or a combination thereof.

11. A navigation system comprising:
a control unit, including a processor, for:
providing a docking area adjacent to and surrounding an entire extent of a map interface,
determining an auction value of the docking area based on an area priority of the docking area;
selecting a docking location, of a map notification, based on receiving a physical gesture including a shake gesture, a tap gesture, a drag gesture, or a combination thereof, representing motion of a device, to move the map notification, from a source location, on the map interface to a location in the docking area specified by a directional motion of the physical gesture and the auction value,
generating a docking notification based on selecting the map notification, wherein the docking location for the docking notification is modified based on a travel context, including a travel theme, for aligning the docking notification with the source location; and
a display interface, coupled to the control unit, for displaying the docking notification at the docking location on a device.

12. The system as claimed in claim 11 wherein the control unit is for determining the docking location based on the travel context, a source location, or a combination thereof for aligning the docking notification with the source location.

13. The system as claimed in claim 11 wherein the control unit is for displaying the docking notification without overlapping the map interface.

14. The system as claimed in claim 11 wherein the control unit is for auctioning the docking area based on a docking availability for displaying the docking notification.

15. The system as claimed in claim 11 wherein the control unit is for determining the docking location of a map notification selected based on an entry type of a user entry.

16. The system as claimed in claim 11 wherein the control unit is for determining the docking location within the docking area for a map notification displayed on the map interface.

17. The system as claimed in claim 16 wherein the control unit is for determining the docking location based on a docking availability of the docking area.

18. The system as claimed in claim 16 wherein the control unit is for displaying the docking notification around a peripheral extent of the map interface without overlapping the map interface.

19. The system as claimed in claim 16 wherein the control unit is for displaying a plurality of the docking notification proportional to a notification quantity of the map notification selected.

20. The system as claimed in claim 16 wherein the control unit is for updating the docking location based on the travel context, a source location, or a combination thereof.

* * * * *